(12) United States Patent
Suzuki et al.

(10) Patent No.: US 12,549,368 B2
(45) Date of Patent: Feb. 10, 2026

(54) INFORMATION PROCESSING DEVICE AND INFORMATION PROCESSING METHOD TO PROVIDE BENEFICIAL INFORMATION TO A USER WITH A NON-FUNGIBLE TOKEN (NFT)

(71) Applicant: SONY GROUP CORPORATION, Tokyo (JP)

(72) Inventors: Takuma Suzuki, Tokyo (JP); Eiji Kamino, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 98 days.

(21) Appl. No.: 18/571,338

(22) PCT Filed: Feb. 10, 2022

(86) PCT No.: PCT/JP2022/005250
§ 371 (c)(1),
(2) Date: Dec. 18, 2023

(87) PCT Pub. No.: WO2022/269989
PCT Pub. Date: Dec. 29, 2022

(65) Prior Publication Data
US 2024/0283650 A1    Aug. 22, 2024

(30) Foreign Application Priority Data
Jun. 24, 2021   (JP) .................. 2021-104859

(51) Int. Cl.
G06F 21/00    (2013.01)
G06Q 30/0241  (2023.01)
H04L 9/32     (2006.01)

(52) U.S. Cl.
CPC ....... *H04L 9/3213* (2013.01); *G06Q 30/0241* (2013.01)

(58) Field of Classification Search
CPC ... H04L 9/3213; H04L 67/02; G06Q 30/0241; G06Q 30/02
See application file for complete search history.

(56) References Cited

U.S. PATENT DOCUMENTS

2020/0005284 A1*  1/2020  Vijayan ............... G06Q 20/065
2022/0368994 A1* 11/2022  Chu .................... H04N 21/4826
(Continued)

FOREIGN PATENT DOCUMENTS

JP    2007-299065 A    11/2007
JP       6804073 B1    12/2020

OTHER PUBLICATIONS

International Search Report and Written Opinion of PCT Application No. PCT/JP2022/005250, issued on Mar. 22, 2022, 09 pages of ISRWO.

*Primary Examiner* — William A Corum, Jr.
(74) *Attorney, Agent, or Firm* — CHIP LAW GROUP

(57) ABSTRACT

The present technology relates to an information processing device, an information processing method, and a program, in which it is possible to provide highly beneficial information to a user who owns a unique token such as an NFT. Information regarding a unique token owned by the user is acquired from a terminal used by a user, and notification information of which the user is notified by the terminal is determined on the basis of the token owned by the user.

10 Claims, 12 Drawing Sheets

(56) References Cited

U.S. PATENT DOCUMENTS

| | | | |
|---|---|---|---|
| 2022/0383351 A1* | 12/2022 | Atreya | ............... H04L 9/3265 |
| 2023/0117801 A1* | 4/2023 | Quigley | ............ G06Q 20/0655 |
| | | | 705/65 |

* cited by examiner

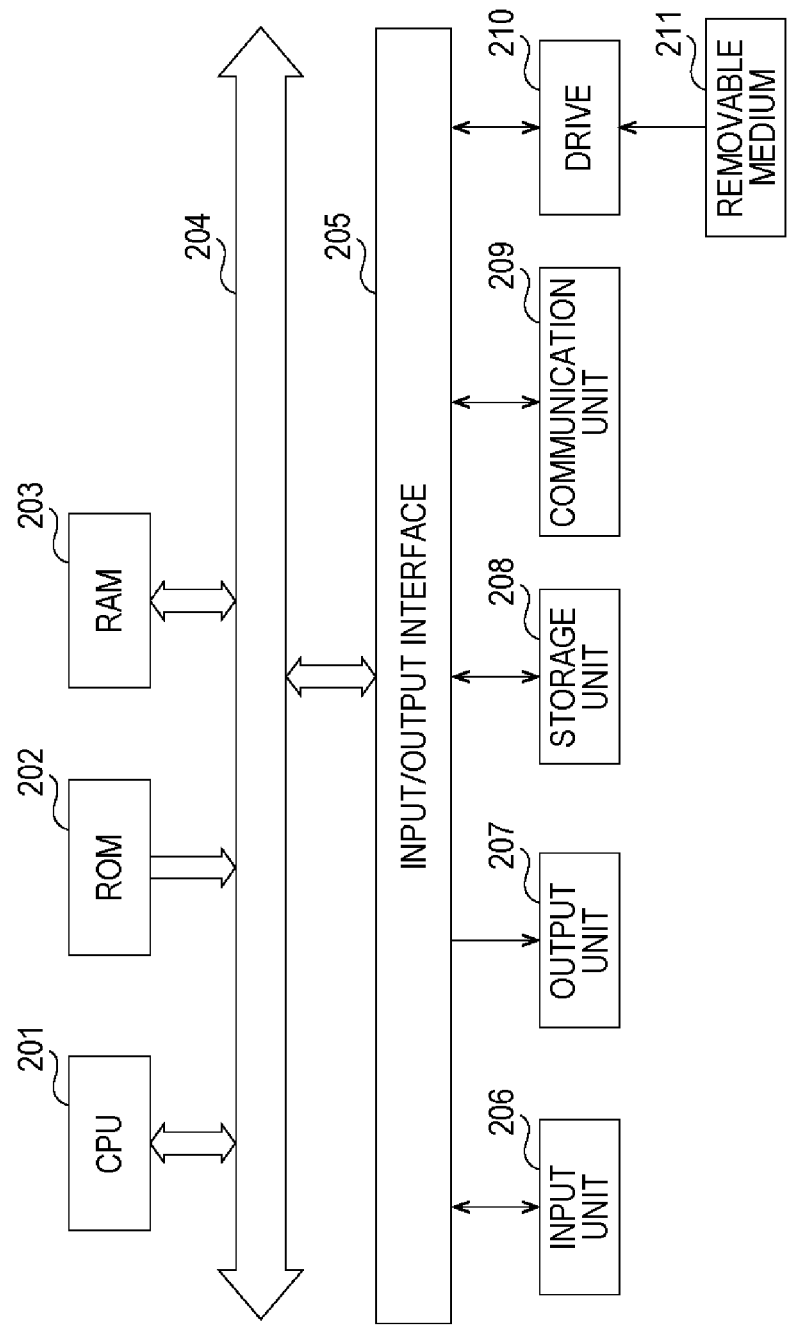

INFORMATION PROCESSING DEVICE AND INFORMATION PROCESSING METHOD TO PROVIDE BENEFICIAL INFORMATION TO A USER WITH A NON-FUNGIBLE TOKEN (NFT)

CROSS REFERENCE TO RELATED APPLICATIONS

This application is a U.S. National Phase of International Patent Application No. PCT/JP2022/005250 filed on Feb. 10, 2022, which claims priority benefit of Japanese Patent Application No. JP 2021-104859 filed in the Japan Patent Office on Jun. 24, 2021. Each of the above-referenced applications is hereby incorporated herein by reference in its entirety.

TECHNICAL FIELD

The present technology relates to an information processing device, an information processing method, and a program, and more particularly, to an information processing device, an information processing method, and a program, in which highly beneficial information can be provided to a user who owns a unique crypto asset (token) such as a non-fungible token (NFT).

BACKGROUND ART

Patent Document 1 describes a technology of recording a transaction history of a non-fungible token (NFT) which is a unique crypto asset by using a blockchain.

CITATION LIST

Patent Document

Patent Document 1: Japanese Patent No. 6804073

SUMMARY OF THE INVENTION

Problems to be Solved by the Invention

In a case where a user who owns a unique token such as an NFT is browsing a website by using a browser application or the like of a terminal, when information in consideration of the token owned by the user is presented, it is highly beneficial for the user.

The present technology has been made in view of such a situation, and makes it possible to provide highly beneficial information to a user who owns a unique token such as an NFT.

Solutions to Problems

According to an aspect of the present technology, there is provided an information processing device including a notification information determination unit configured to acquire, from a terminal used by a user, information regarding a unique token owned by the user, and determine notification information of which the user is notified by the terminal on the basis of the token owned by the user, or a program for causing a computer to function as the information processing device.

According to another aspect of the present technology, there is provided an information processing method including, by a notification information determination unit of an information processing device including the notification information determination unit, acquiring, from a terminal used by a user, information regarding a unique token owned by the user, and determining notification information of which the user is notified by the terminal on the basis of the token owned by the user.

In the information processing device, the information processing method, and the program according to the aspect of the present technology, information regarding a unique token owned by the user is acquired from the terminal used by a user, and the notification information of which the user is notified by the terminal is determined on the basis of the token owned by the user.

BRIEF DESCRIPTION OF DRAWINGS

FIG. 12 is a block diagram illustrating a configuration example of hardware of a computer in a case where the computer executes a series of processing with a program.

MODE FOR CARRYING OUT THE INVENTION

Hereinafter, embodiments of the present technology will be described with reference to the drawings.

Embodiment of Information Processing System

Figure 1:
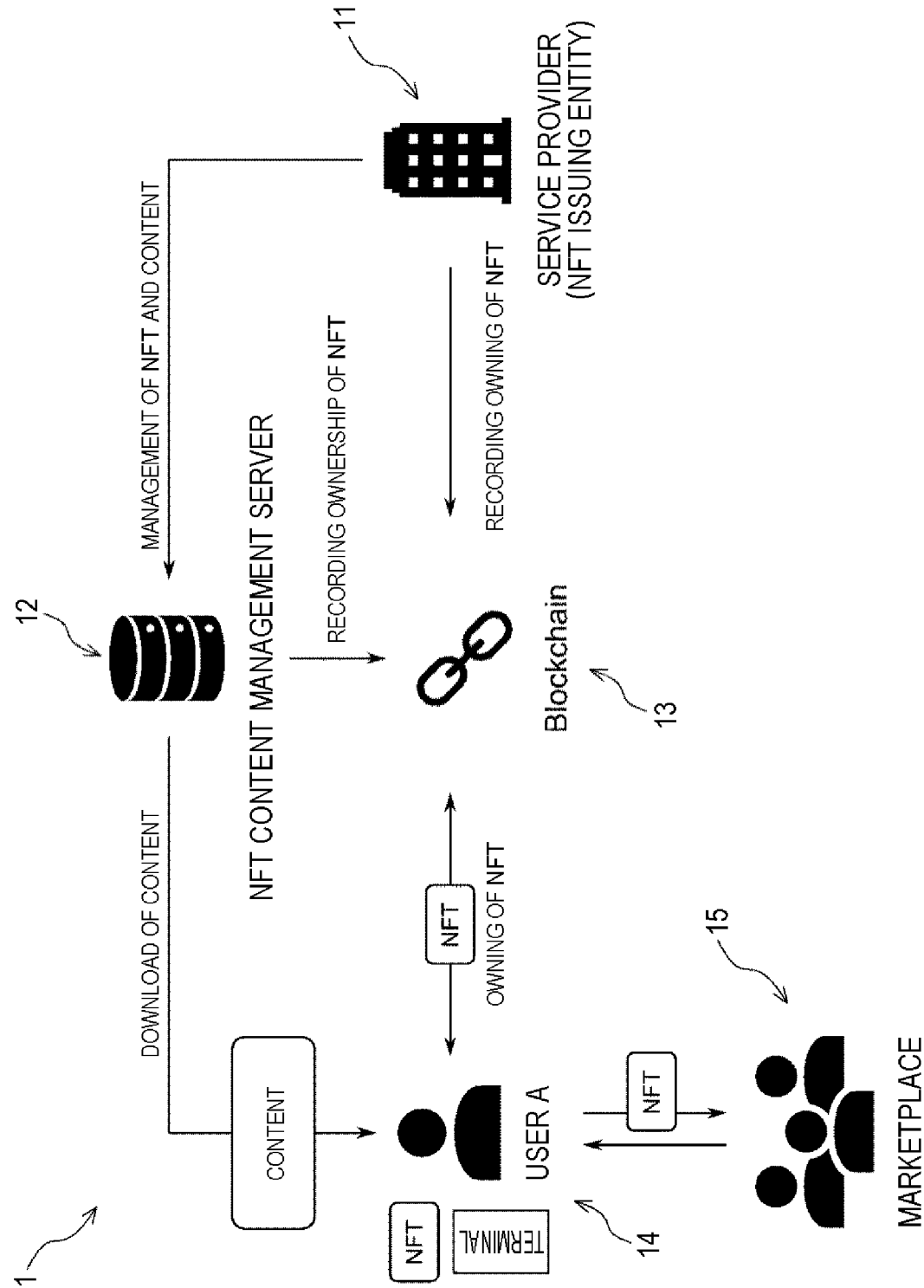
FIG. 1 is a block diagram illustrating a configuration of an embodiment of an information processing system to which the present technology is applied.

FIG. 1 is a block diagram illustrating a configuration of an embodiment of an information processing system to which the present technology is applied. An information processing system 1 of FIG. 1 includes a service provider 11, an NET content management server 12, a blockchain 13, a client terminal 14, and a marketplace 15. Note that the client terminal 14 indicates a client terminal used by a predetermined user A among a plurality of client terminals used by a plurality of users.

An outline of overall processing of the information processing system 1 will be described. The service provider 11 is an NFT issuing entity that mainly issues a non-fungible token (NFT), provides a web service (website), and the like by using the NET content management server 12 (hereinafter, simply referred to as the management server 12). The service provider 11 may be a business association such as a company or may be an individual. The service provider 11 generates, by the management server 12, information regarding an NFT (NFT-related information) for issuing an NFT representing (symbolizing) a content (for example, digital data) stored in the management server 12 and transaction information, and transmits the generated information to the blockchain 13. The NFT-related information includes, for example, an ID which is identification information of an NFT, an address (corresponding to an account number) of an owner, and information for specifying metadata of a content. In a case where the owner of the NFT (content) to be issued is the user A, the management server 12 sets the address of the user A on the blockchain 13 as an NFT issuance destination (owner). The user who is the owner of the NFT may be, for example, a user who has taken a purchase procedure of an NFT with respect to the service provider 11 by a predetermined method, a user selected by the service provider 11 under a predetermined condition, or the like.

On the blockchain 13, when the NFT-related information and transaction information transmitted from the management server 12 are agreed using a consensus building algorithm, the transaction information is recorded on the blockchain 13. As a result, the NFT representing a predetermined content is issued with the user A as the owner. Note that after issuing the NFT with the service provider 11 on the blockchain 13 as the owner, the NFT may be traded with the user A to change the owner of the NFT to the user A.

The user A who has become the owner of the NFT can download (NFT-converted) content represented as the NFT from the management server 12 to the client terminal 14 by causing the own client terminal 14 to access the management server 12 through a communication line (for example, the Internet). The client terminal 14 may be a mobile terminal such as a smartphone or a tablet, or may be a personal computer (PC) or the like. The user A can browse the content downloaded to the client terminal 14 on the client terminal 14 or the like. The NFT owned by the user A can be secondarily distributed in the marketplace 15 accessible to the blockchain 13. The user A can trade the NFT owned by the user A with another person through the marketplace 15. Note that the marketplace 15 is an electronic market that can access the blockchain 13 and in which a transaction (buying and selling) of the NFT can be performed. OpenSea and the like are known as a marketplace corresponding to Ethereum which is a blockchain.

Here, the NFT is digital data that is issued and traded on the blockchain 13 and has a role as a non-counterfeit certificate and an ownership certificate. The NET has a non-fungible property (non-substitutable property) and represents (symbolizes) a unique content. Examples of a content targeted for the NFT include general digital items that are intangible objects such as music files, moving images, electronic books, sentences, and the like. However, the content to be NFT-converted is not limited to an intangible object such as a digital item, and may be a target of the NFT even when the content is a service or a tangible object.

The NFT is generated on the basis of, for example, an Ethereum Request for Comments (ERC) 721 or an ERC 1155 which is a token standard. As the type of token in which the transaction information is recorded on the blockchain 13, there is a fungible token (FT) having a fungible property such as cryptocurrency (virtual currency), in addition to the token that is the unique crypto asset such as the NFT. The fungible token is generated, for example, on the basis of ERC 20, which is a token standard. In the present embodiment, a token that is a unique crypto asset is referred to as an NFT, and a fungible token is referred to as cryptocurrency. However, the unique crypto asset (token) may be one other than the NFT.

The blockchain 13 is a type of database constructed by a P2P computer network by using a well-known blockchain mechanism. Ethereum and the like are known as existing blockchains. The blockchain 13 records the NFT-related information, the transaction information (transaction history), and the like.

The present technology is a technology of presenting notification information related to an NFT owned by the user A to the user A when the user A browses a website by using a browser application of the client terminal 14 owned by the user A in the information processing system 1 as illustrated in FIG. 1. Thus, useful information based on the NET is provided to the user who owns the NFT. Hereinafter, the present technology will be mainly described as being implemented by the management server 12 in FIG. 1. However, the present technology is not limited to the case of being mainly implemented by the management server 12 in FIG. 1. The present technology can be implemented by any information processing device communicably connected to the client terminal 14, and can also be implemented by processing in the client terminal 14. For example, the management server 12 in FIG. 1 is a server that performs services such as issuance of an NFT and provision of a website, but may be a server that appropriately transmits notification information related to the present technology to the client terminal 14 without providing these services.

Note that, in the following description, it is assumed that the notification information related to the NFT owned by the user A is displayed on a screen of the browser application for browsing a website of the client terminal 14. However, the present technology may be a case where the notification information is displayed on a screen of an arbitrary application instead of the screen of the browser application for browsing a website. In the following description, it is assumed that the browser application is an application for displaying a website. However, in the present technology, the browser application may be an application for accessing a site (server) not corresponding to the website to acquire information.

Device Configuration of Information Processing System 1

Figure 2:
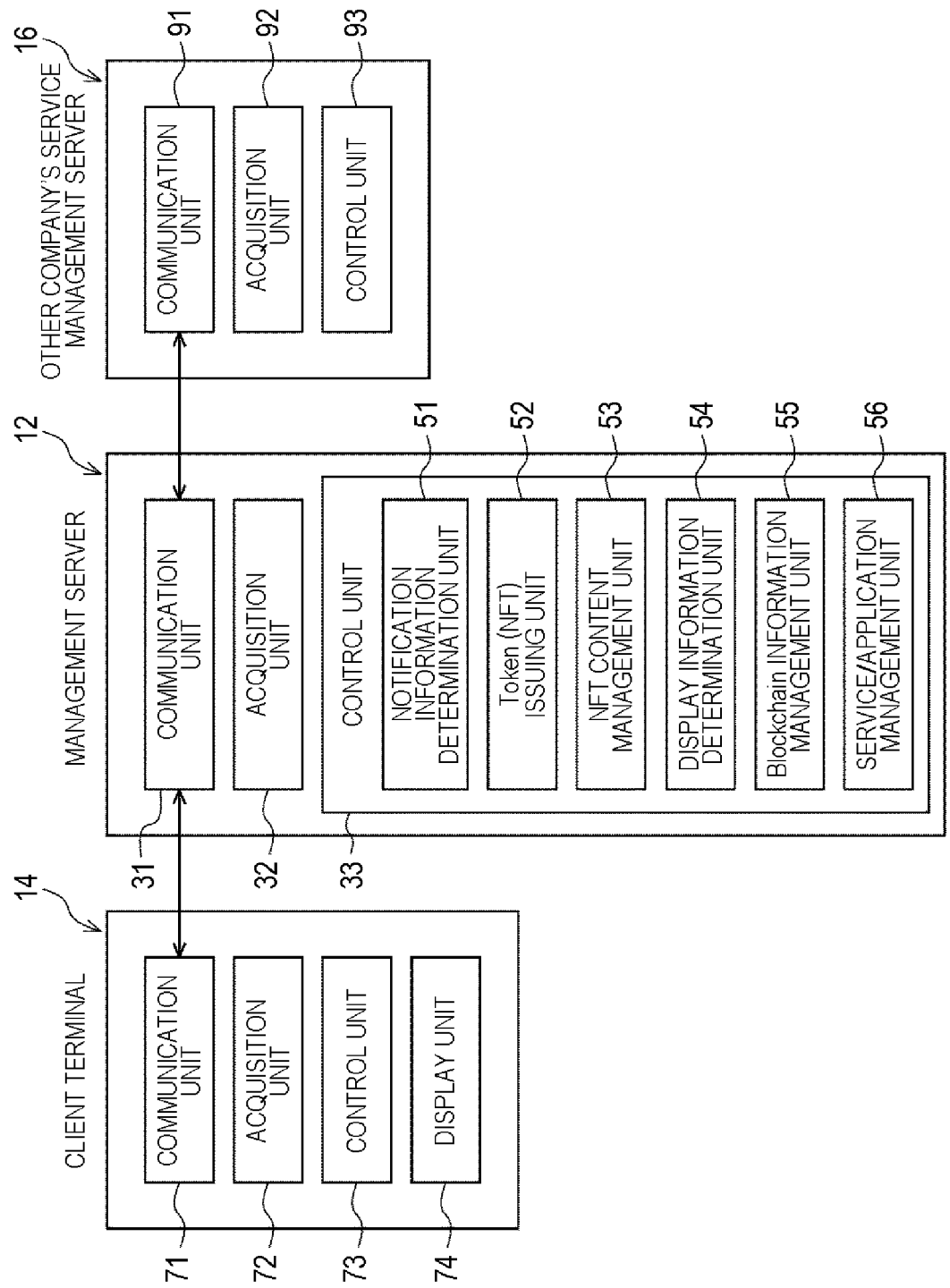
FIG. 2 is a block diagram illustrating a configuration of a management server, a client terminal of a predetermined user, and other company's service management server in an information processing system.

FIG. 2 is a block diagram illustrating a configuration of the management server 12, the client terminal 14 of a predetermined user A, and other company's service management server 16 (not illustrated in FIG. 1) in the information processing system 1 of FIG. 1. Note that other company's service management server 16 represents a management server operated by a company different from a company that operates the management server 12.

The management server 12 is communicably connected to each of the client terminal 14 and other company's service management server 16 via the Internet. Note that, in the present embodiment, the Internet is used for communication between the devices, but any communication network other than the Internet may be used, or communication between the devices may be configured by communication based on a plurality of types of communication standards.

The management server 12 mainly manages a web service provided to the client terminal 14 or a browser application operated in the client terminal 14. The web service is to, for example, provide a website or provide notification information related to the NFT owned by the user. The browser application is an application that is operated in the client terminal 14 and allows the user A to browse a website on the Internet.

The management server 12 issues the NFT, records the NFT-related information on the blockchain 13, records the NFT-converted content and the ID of the NFT in association with each other, and manages transaction information recorded on the blockchain 13 via a web service or a browser application managed by the management server 12.

The management server 12 includes a communication unit 31, an acquisition unit 32, and a control unit 33.

The communication unit 31 controls communication. The communication unit 31 exchanges various kinds of information by communication between the client terminal 14 and other company's service management server 16 via the Internet.

The acquisition unit 32 acquires information from the client terminal 14 and other company's service management server 16 via the communication unit 31.

The control unit 33 executes various processing by executing a program. The control unit 33 includes, as processing units constructed by executing a program, a notification information determination unit 51, a token (NFT) issuing unit 52 (hereinafter, referred to as an NFT issuing unit 52), an NET content management unit 53, a display information determination unit 54, a blockchain information management unit 55, and a service/application management unit 56.

The notification information determination unit 51 generates notification information (NFT-related notification information and advertisement information) of which the user is notified by the client terminal 14.

The NNFT issuing unit 52 issues an NFT representing a content.

The NET content management unit 53 manages a content associated with the NFT (ID of NFT).

The display information determination unit 54 generates display information to be displayed on the client terminal 14.

The blockchain information management unit 55 manages transaction information regarding a transaction executed by the application of the client terminal 14 or the management server 12 and the NFT-related information.

The service/application management unit 56 manages the web service (presentation of the website or the like) provided by the management server 12 and the browser application operated by the client terminal 14. The service/application management unit 56 records transaction information on the blockchain 13 and calls the transaction information recorded on the blockchain 13. The service/application management unit 56 manages user information that is information regarding a user.

The client terminal 14 is a device mainly using a web service and a browser application. The client terminal 14 may be, for example, a personal computer (PC), a smartphone, a tablet, or the like.

The client terminal 14 includes a communication unit 71, an acquisition unit 72, a control unit 73, and a display unit 74.

The communication unit 71 controls communication. The communication unit 71 exchanges various kinds of information by communication between the management server 12 and other company's service management server 16 via the Internet.

The acquisition unit 72 acquires information from the management server 12 and other company's service management server 16 via the communication unit 71.

The control unit 73 calls information (site information) regarding a website browsed on the client terminal 14 or information (application information) acquired by the browser application operated by the client terminal 14, performs display control on the display unit 74, records and calls transaction information in and from the blockchain 13, manages a wallet, and the like.

The display unit 74 is a display that displays information to the user A. The display unit 74 is, for example, a display with a touch panel, and the client terminal 14 includes an operation unit (not illustrated) with which the user A performs an input operation.

Other company's service management server 16 is a server through which a company different from a company that operates the management server 12 provides the web service. Other company's service management server 16 represents an arbitrary number of servers which the client terminal 14 accesses, and is not limited to a server that provides a specific web service.

Other company's service management server 16 includes a communication unit 91, an acquisition unit 92, and a control unit 93.

The communication unit 91 controls communication. The communication unit 91 exchanges various kinds of information by communication between the management server 12 and the client terminal 14 via the Internet.

The acquisition unit 92 acquires information from the management server 12 and the client terminal 14 via the communication unit 91.

The control unit 93 manages the web service provided by other company's service management server 16, records and calls transaction information in and from the blockchain 13, manages user information which is information regarding a user, and the like. However, the processing of the control unit 93 differs depending on the use of other company's service management server 16.

Display Example of Browser Application

The client terminal 14 is assumed to be, for example, a smartphone. It is assumed that an object managed by the management server 12 is a browser application. When the user A starts the browser application on the client terminal 14, a predetermined home screen is displayed. The home screen is information of an arbitrary website set by the user A.

Figure 3:
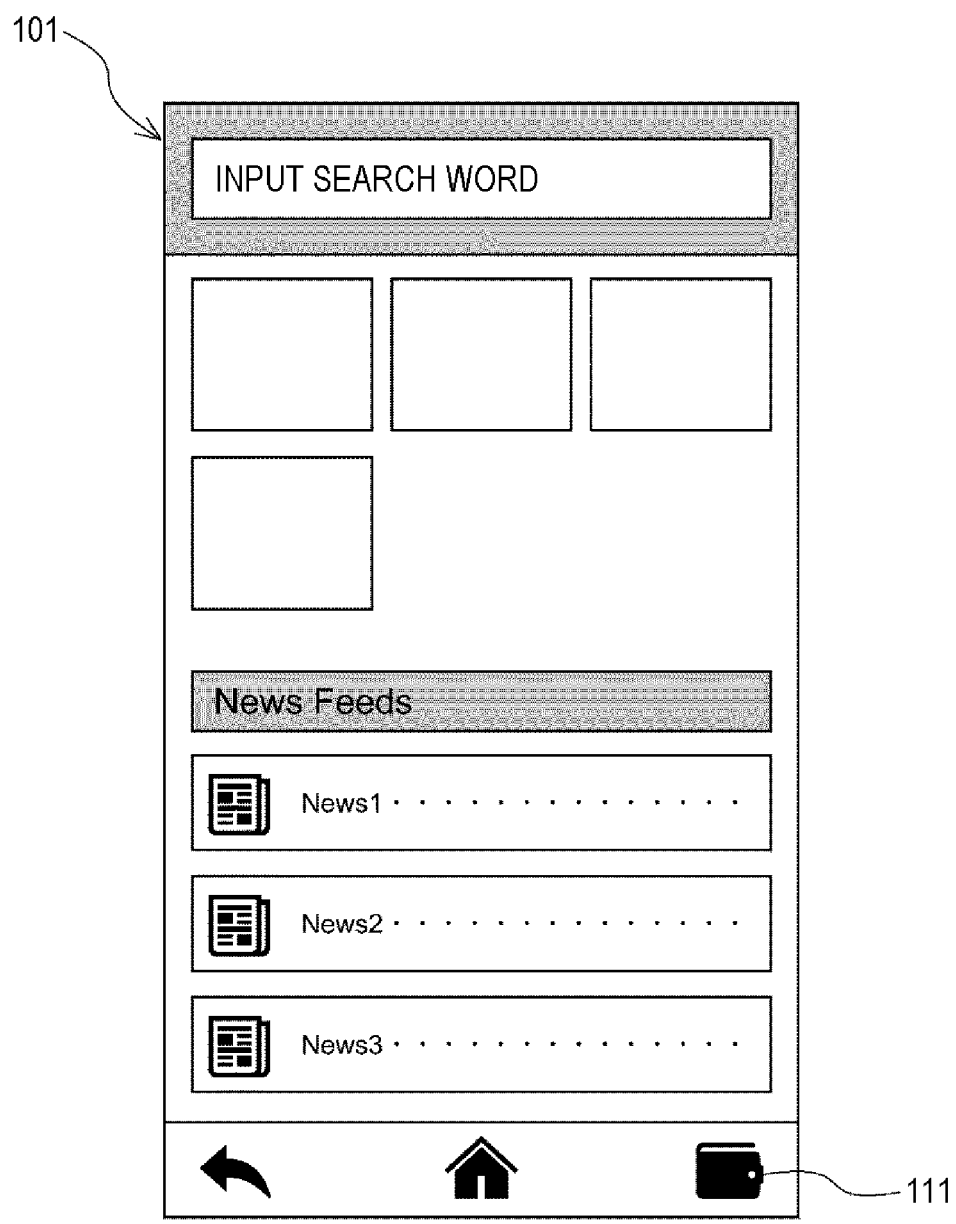
FIG. 3 is a diagram illustrating a home screen displayed by a browser application of a client terminal.

FIG. 3 is a diagram illustrating the home screen displayed by the browser application of the client terminal 14. In FIG. 3, a home screen 101 is a screen of a browser application, which is displayed on a part or the whole of the display unit 74 of the client terminal 14. The home screen 101 may be, for example, a home page of a website managed by the management server 12. The home screen 101 displays, for example, news and links to other websites. However, the configuration of the home screen 101 differs depending on the website displayed as the home screen 101.

An icon of a fixed menu is displayed below the screen of the browser application. In the fixed menu, for example, a wallet icon 111 is displayed in addition to a return icon for returning to the previous screen, a home icon for returning to the home screen, and the like. When the user A selects the wallet icon 111, the home screen 101 of the client terminal 14 is switched to the wallet screen. The wallet screen is a screen that displays information such as the NFT and cryptocurrency owned by the user A.

Figure 4:
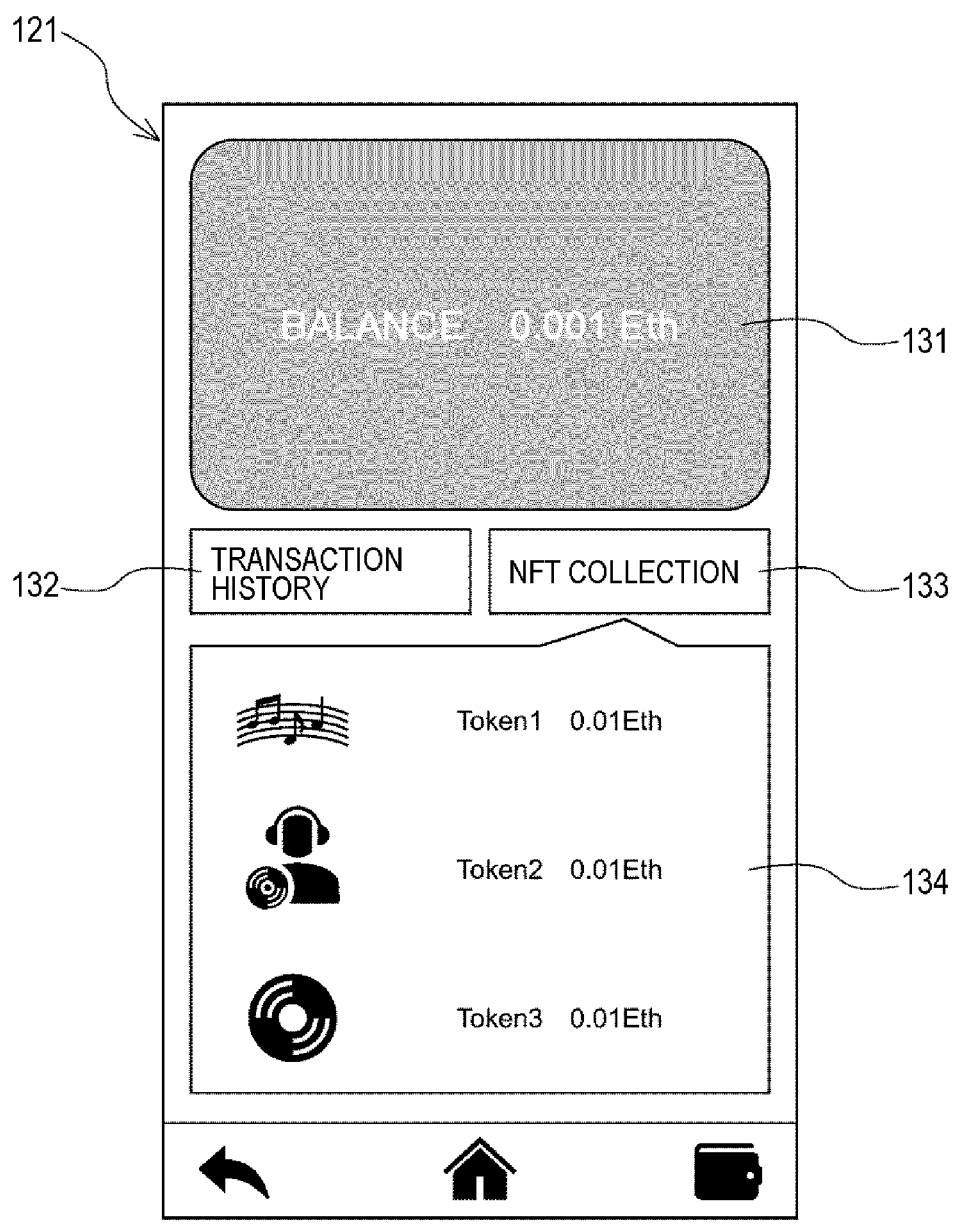
FIG. 4 is a diagram illustrating a wallet screen displayed on a client terminal.

FIG. 4 is a diagram illustrating the wallet screen displayed on the client terminal 14. In FIG. 4, a balance screen 131, a transaction history button 132, an NFT collection button 133, an NFT list screen 134, and the like are displayed on a wallet screen 121.

On the balance screen 131, the balance of the cryptocurrency owned by the user A on the blockchain 13 is displayed. The transaction history button 132 is a button for displaying a transaction history recorded on the blockchain 13, such as a transaction history in which payment is made by the cryptocurrency. The NFT collection button 133 is a button for displaying a list of NFTs owned by the user A. The NFT list screen 134 is displayed in a case where the user A selects the NFT collection button 133. The NFT list screen 134 displays a list of the NFTs owned by the user A. When the user A selects the transaction history button 132, a transaction history screen displaying a transaction history is displayed instead of the NFT list screen 134.

The browser application accesses the wallet of the user A and acquires a secret key stored in the wallet. The secret key is required to acquire a transaction history for an address of the user A on the blockchain 13 corresponding to the secret key (a value generated by performing cryptographic hashing on a public key generated from the secret key). Examples of the transaction include payment by cryptocurrency, and receipt of cryptocurrency, delivery of an NFT. At the time of the transaction of the cryptocurrency and the NFT, information (transaction information) regarding the content of the transaction is encrypted by a public key cryptosystem using a secret key, and is recorded on the blockchain 13 together with a signature using the secret key.

The browser application acquires information regarding the balance of the cryptocurrency of the user A, information regarding the transaction history, and the NFT-related information from the blockchain 13 by accessing the wallet of the user A, and displays the information as illustrated in FIG. 4.

Note that, in a case where the balance of the cryptocurrency, the transaction history, and the NFT-related information are acquired from the blockchain 13, a decentralized-application (Dapp) operated on the blockchain 13 is used. The browser application accesses the Dapp via middleware such as MetaMask and web3.js for connecting to the blockchain 13, and acquires the balance of the cryptocurrency, the transaction history, the NFT-related information, and the like on the blockchain 13 from the Dapp. Such a browser application capable of exchanging information with the Dapp is also referred to as a Dapps browser. The browser application managed by the management server 12 is a Dapps browser, and by accessing a web server managed by other company like a normal browser, information of a website provided by the web server is displayed on the client terminal 14 as a web screen.

Figure 5:
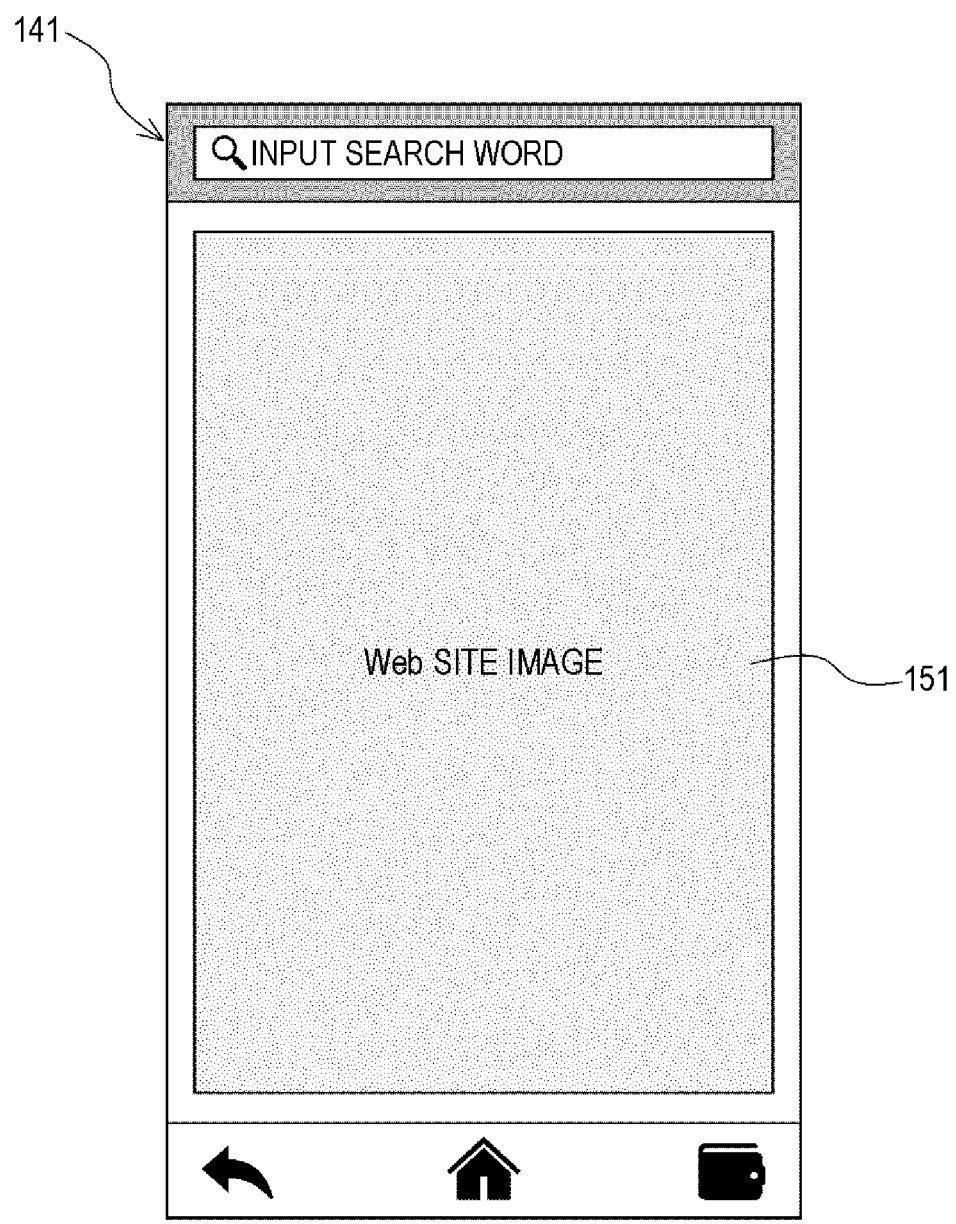
FIG. 5 is a diagram illustrating a web screen displayed on a client terminal.

FIG. 5 is a diagram illustrating the web screen displayed on the client terminal 14. In FIG. 5, a web screen 141 is displayed on the client terminal 14 when an arbitrary website is accessed by the browser application of the client terminal 14. A website image 151 is displayed on the web screen 141. The website image 151 is displayed by omitting details of the contents (a character, an image, a moving image, and the like) provided by the website, and represents a screen range in which various contents are arranged and displayed.

In the client terminal 14, the information (application information) acquired by the browser application is acquired (recorded) by the acquisition unit 72 via the communication unit 71. The control unit 73 performs display control on the display unit 74 on the basis of the application information acquired by the acquisition unit 72.

When the browser application of the client terminal 14 is activated, the management server 12 appropriately transmits the NFT-related notification information displayed by the browser application to the client terminal 14 as application information. The NFT-related notification information is information related to the NFT owned by the user A, and is notification information (NFT-related notification information or advertisement information to be described later) of which the user A is notified. Note that the NFT-related notification information is simply referred to as notification information. The notification information transmitted from the management server 12 is acquired by the acquisition unit 72 via the communication unit 71 in the client terminal 14. The notification information acquired by the acquisition unit 72 is updated to the latest notification information every time new notification information is transmitted from the management server 12. The control unit 73 displays the notification information updated by the acquisition unit 72 on the display unit 74.

Since the browser application can access the wallet of the user A, the browser application can connect to a site that operates an exchange (or a place of sale) of the cryptocurrency, a marketplace of the NFT, or the like and perform various transactions for the legal currency, the cryptocurrency, and the NFT. In a case where a transaction of the cryptocurrency or the NFT is performed using the browser application, the control unit 73 generates a command related to recording of transaction information regarding the transaction on the blockchain 13, and transmits the command from the communication unit 71 to the blockchain 13. Note that the transaction information may be transmitted to the blockchain 13 from a server of a site operating an exchange (or a place of sale) of the cryptocurrency in which the transaction is performed, a marketplace of the NFT, or the like. In the blockchain 13, for example, a consensus using a consensus building algorithm at each node of the blockchain 13 is performed on newly transmitted transaction information, and thus the transaction information is recorded on the blockchain 13. The transaction information recorded on the blockchain 13 by using the browser application of the client terminal 14 is also transmitted to and recorded in the management server 12. The transaction information may be transmitted to the management server 13 and stored only in a case where there is an opt-in approval (prior approval) from the user A with the browser application.

First Example: Display of NFT-related Notification Information

The first example is an example in which, in a case where a website related to an NTF owned by the user A is browsed by a browser application in the client terminal 14, notification information for notifying the user A of the fact is displayed on the client terminal 14. Examples of the website related to the NTF include a website corresponding to the NFT or a website in which an event corresponding to the NFT is performed. That is, the notification information (NFT-related notification information) indicating that the website browsed by the user A with the browser application is related to the NTF owned by the user A includes, for example, the following first notification information and second notification information.

The first notification information is NFT-related notification information indicating that the website browsed by the user A with the browser application corresponds to the NFT owned by the user A. The website corresponding to the NFT is a website that can handle the NFT, for example, payment by the NFT or transaction of the NFT.

The second notification information is NFT-related notification information indicating that the website browsed by the user A with the browser application performs an event related to the NFT owned by the user A.

These pieces of notification information are generated in the management server 12 and transmitted to the client terminal 14. That is, the control unit 33 (notification information determination unit 51) of the management server 12 acquires information regarding the NFT owned by the user A and information regarding the website browsed by the user A from the client terminal 14, and determines the notification information of which the user A is notified on the basis of the acquired information regarding the NFT and the website.

According to this, since it is common for the user to own the NFT suitable for the user's preference, it is possible to perform individual notification to the user in accordance with the NFT owned by the user. By changing the notification depending on the rarity degree, rank, amount, or the like of the NFT owned by the user, it is possible to perform the notification corresponding to the service or the degree of preference.

Figure 6:
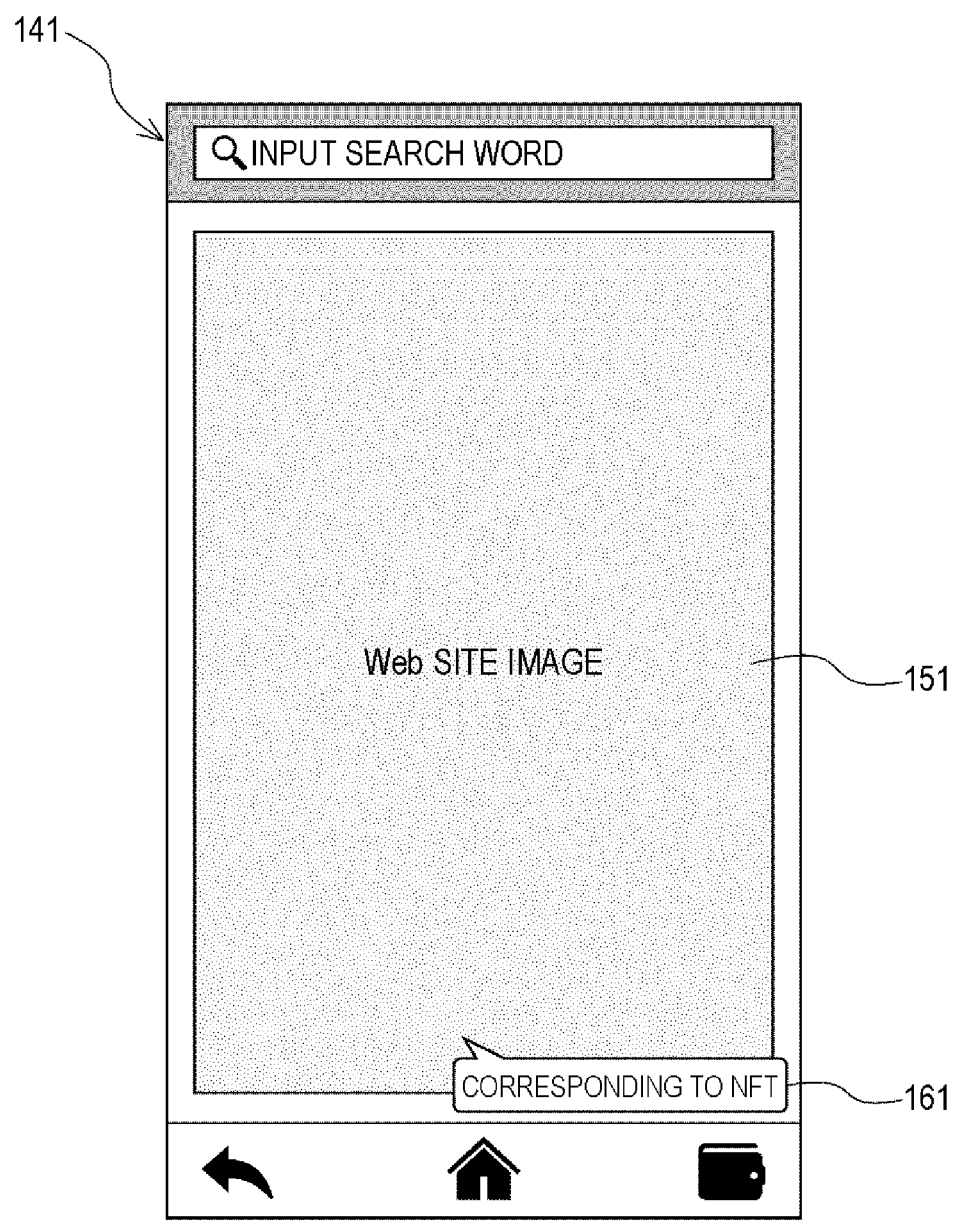
FIG. 6 is a diagram illustrating a first notification information displayed on a web screen of a client terminal.

FIG. 6 is a diagram illustrating the first notification information displayed on the web screen of the client terminal 14. Note that, in the figure, a portion corresponding to the web screen 141 of FIG. 5 is denoted by the same reference numeral as that of the web screen 141 of FIG. 5, and the description thereof will be omitted. In FIG. 6, first notification information 161 is displayed so as to be popped up over the website image 151. That is, the user A is notified of the first notification information 161 in addition to the information regarding the website. The first notification information 161 indicates that the website browsed by the user A with the browser application corresponds to the NFT owned by the user A. The first notification information 161 includes, for example, character information "Corresponding to NFT". The character information included in the first notification information 161 is not limited to the "Corresponding to NFT", and may be, for example, only character information "NFT" or other character information.

Figure 7:
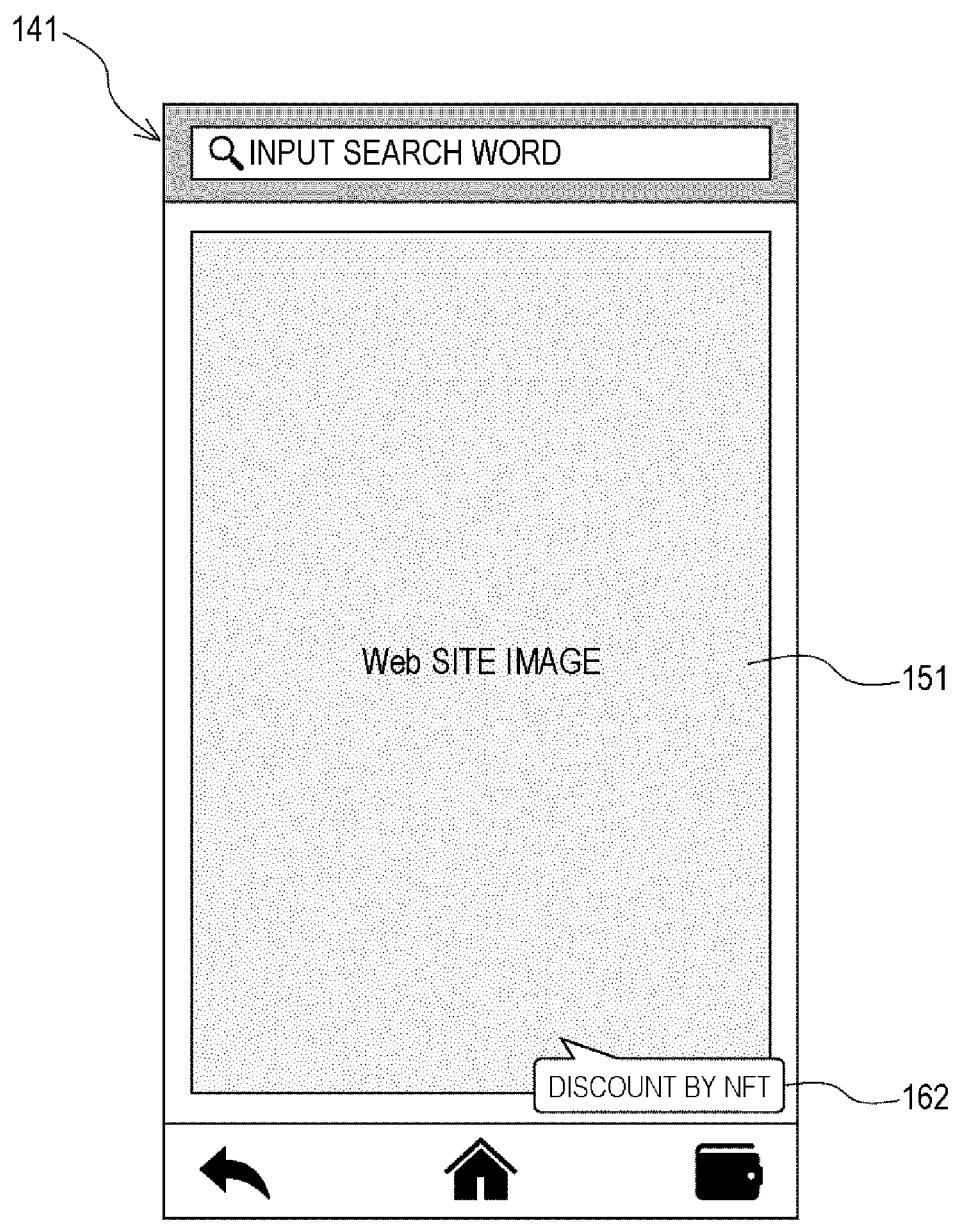
FIG. 7 is a diagram illustrating a second notification information displayed on a web screen of a client terminal.

FIG. 7 is a diagram illustrating the second notification information displayed on the web screen of the client terminal 14. Note that, in the figure, a portion corresponding to the web screen 141 of FIG. 5 is denoted by the same reference numeral as that of the web screen 141 of FIG. 5, and the description thereof will be omitted. In FIG. 7, second notification information 162 is displayed so as to be popped up over the website image 151. That is, the user A is notified of the second notification information 162 in addition to the information regarding the website. The second notification information 162 indicates that the website browsed by the user A with the browser application is a website in which an event related to the NFT owned by the user A is performed. The second notification information 162 includes, for example, character information indicating a content of the event related to the NFT. In FIG. 7, the second notification information 162 includes character information "discount by NFT". Examples of the event performed by the website include an event in which the NFT related to the NFT owned by the user A can be acquired in the website, and an event in which the user A can receive a reward by owning the NFT. The second notification information 162 may be character information indicating the contents of these events. The character information included in the second notification information 162 is not limited to the character information indicating the content of the event related to the NFT, and may be, for example, only the character information "NFT" or any information related to the NFT in the website.

Note that in a case where the browser application of the client terminal 14 displays a website managed by the management server 12, the management server 12 may transmit the first or second notification information to the client terminal 14 as application information for the browser application, or may transmit the first or second notification information to the client terminal 14 as information in a website (web page).

Processing Procedure of First Example

Figure 8:
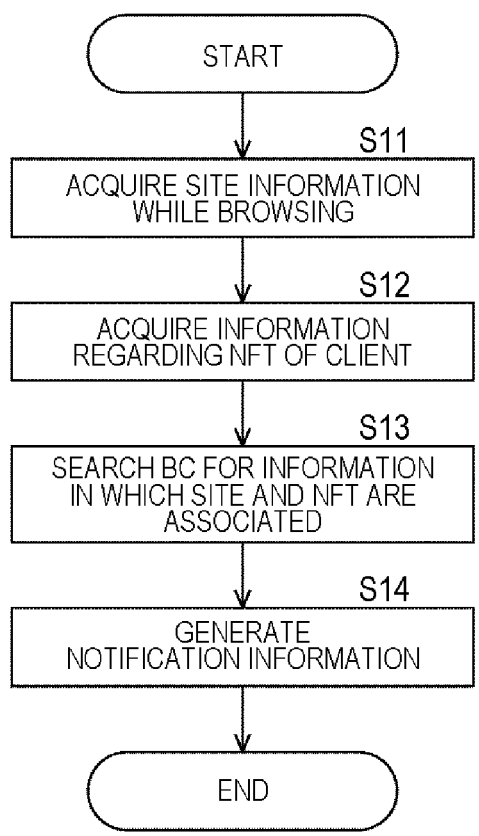
FIG. 8 is a flowchart illustrating a processing procedure according to a first example.

FIG. 8 is a flowchart illustrating a processing procedure according to a first example.

In step S11, the control unit 33 (service/application management unit 56) of the management server 12 acquires site information regarding a website browsed with the browser application of the client terminal 14. The processing proceeds from step S11 to step S12. The management server 12 may acquire the site information from the client terminal 14, or may acquire the site information from other company's service management server 16 that provides a website.

In step S12, the control unit 33 (NFT content management unit 53) acquires NFT-related information regarding the NFT owned by the client terminal 14 (user A). The processing proceeds from step S12 to step S13.

Note that the NFT-related information regarding the NFT owned by the user A is personal information acquired with the browser application of the client terminal 14 accessing a wallet. Therefore, in a case where the NFT-related information is transmitted from the client terminal 14 to the management server 12, prior approval by the user A is necessary. Note that the blockchain information management unit 55 of the management server 12 manages the NFT issued by the management server 12. Therefore, the control unit 33 can acquire the NFT-related information regarding the NFT issued by the management server 12 and owned by the user A from the blockchain information management unit 55 without the prior approval of the user A. However, even in this case, the prior approval of the user A for use of the NFT-related information may be obtained.

In step S13, the control unit 33 (service/application management unit 56) searches the blockchain 13 for a record in which the site information acquired in step S11 is associated with the NFT-related information acquired in step S12. The processing proceeds from step S13 to step S14.

In step S14, the control unit 33 (notification information determination unit 51) generates (determines) the notification information (NFT-related notification information) according to the association between the site information and the NFT-related information. The control unit 33 transmits the generated notification information to the client terminal 14 via the communication unit 31. As a result, the notification information is displayed with the browser application of the client terminal 14.

The notification information can be personalized notification information in accordance with the NFT owned by the user A, notification information based on a rarity degree, rank, or amount of the NFT owned by the user A, or notification information corresponding to a service or a preference degree.

In particular, in a case where the website browsed with the browser application of the client terminal 14 is a website provided (managed) by the management server 12, the management server 12 itself has a lot of pieces of site information related to the website. Therefore, the notification information generated in step S14 can not only simply indicate that it corresponds to the NFT, but also be notification information with a larger information amount or more, or more personalized notification information in accordance with the NFT-related information owned by the user A.

Specific examples of the notification information personalized in accordance with the NFT owned by the user A will be described. For example, it is assumed that a content (NFT content) associated with the NFT owned by the user A is an artist's digital card. It is assumed that the web site browsed by the user A with the browser application of the client terminal 14 is a website managed by the management server 12, and is a site that provides album information, live information, and the like regarding various artists, issues a new NFT for a digital card, and the like. In this case, the notification information can preferentially include information regarding the artist of the NET content owned by the user A. Alternatively, the notification information can include album information (information regarding the latest album or the like) or live information of the artist of the NET content owned by the user A. Alternatively, the notification information can include new NFT issuance information regarding the artist of the NET content owned by the user A. In this manner, by using the notification information corresponding to the NFT owned by the user, it is possible to provide information corresponding to the preference to each user.

Specific examples of the notification information corresponding to the rarity degree, rank, or amount of the NET owned by the user A will be described. For the NFT owned by the user A, the management server 12 may obtain information such as a rarity degree or a rank. For example, in a case where the management server 12 issues the NFT owned by the user A or in a case where the user A performs a transaction, the management server 12 can obtain a rank based on the rarity degree of the NFT, the amount of money paid for the purchase of the NFT, or the like. Note that the rank may be set for the user. The management server 12 changes the notification information according to the rarity degree or rank of the NFT owned by the user A. For example, for a user who owns an NFT having a high rarity degree, notification information that can be known only by the user who owns the NFT may be included. For the user who owns the NFT having a high rank, notification information that allows only the user who owns the NFT to pre-book a ticket or the like may be included. For a user who owns a predetermined amount or more of NFTs of a specific artist, notification information that can be determined to be highly valuable and be known only by the user may be included.

Note that the management server 12 or the client terminal 14 may record information regarding a holding period of the NFT owned by the user, and the notification information may be changed according to the holding period of the NFT. For example, the notification information may include NFT information with the second highest rank according to the holding period of the NFT. When the notification information corresponding to the holding period of the NFT is presented to the user, for example, it is possible to obtain a history of the user who is a fan of the artist as fan, and to provide notification of a service provided only to a core fan as the notification information.

Second Example: Advertisement Information

The second example is an example in which in the client terminal 14, advertisement information related to the NTF owned by the user A is displayed on the client terminal 14.

In general, since it is assumed that the user collects NFTs of interest, the NFT owned by the user often match the user's preference. Thus, when the user A browses the website with the browser application of the client terminal 14, advertisement information based on the NFT owned by the user A or transaction information is displayed on the client terminal 14. As a result, advertisement information suitable for the user A is presented to the user A.

Figure 9:
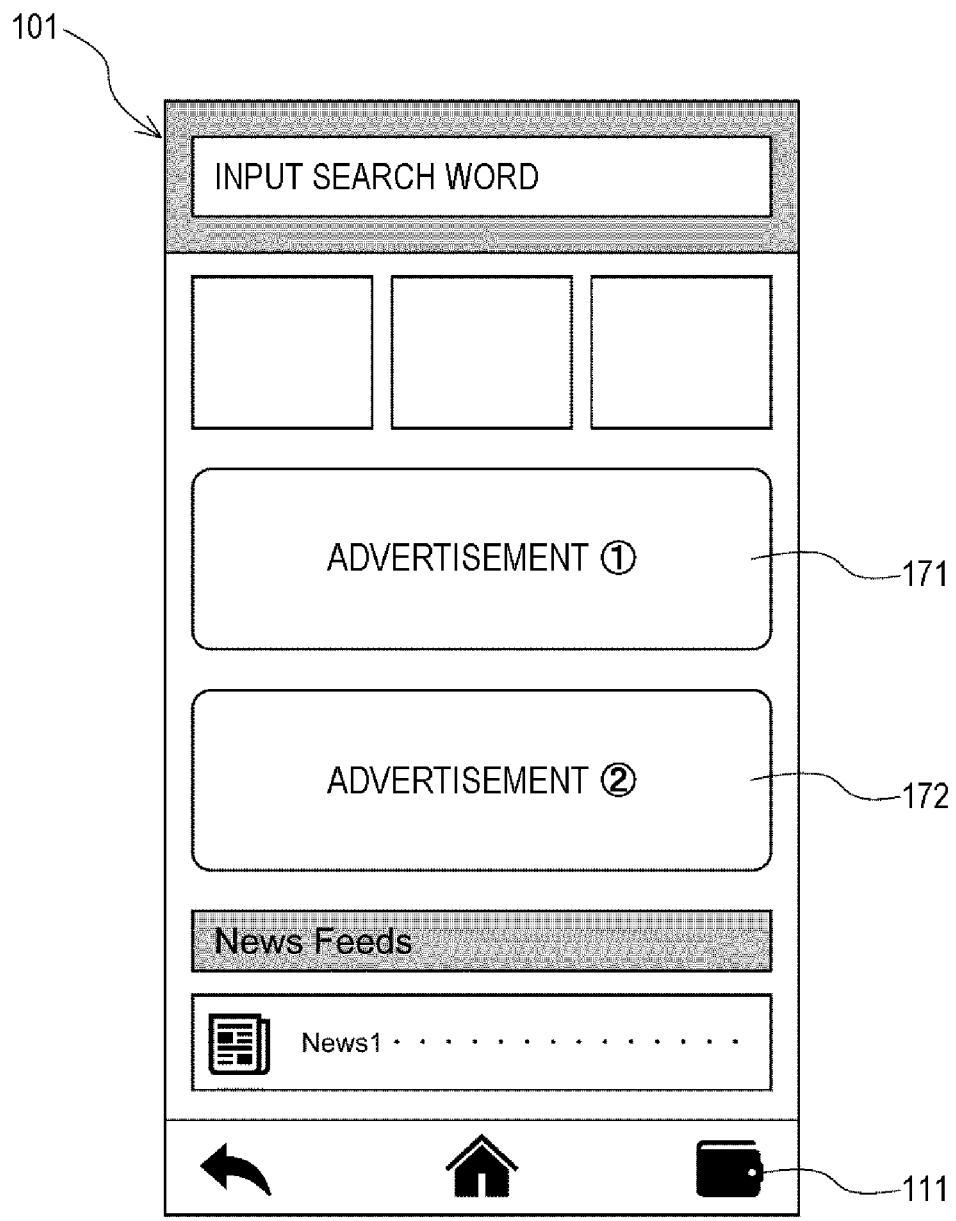
FIG. 9 is a flowchart illustrating a processing procedure according to the first example.

FIG. 9 is a diagram illustrating advertisement information displayed on the home screen of the client terminal 14. In FIG. 9, advertisement information 171 and advertisement information 172 indicate a form in which the advertisement information is displayed on the home screen 101 of FIG. 4. The advertisement information 171 and the advertisement information 172 are information selected by the management server 12 on the basis of the transaction information recorded in the NFT owned by the user A or on the blockchain 13. Note that the advertisement information 171 and the advertisement information 172 may be selected in consideration of history information of the website browsed by the user A with the browser application in the past. The management server 12 has various kinds of advertisement information in advance.

The advertisement information 171 and the advertisement information 172 are displayed in an advertisement display region on the home screen 101. The advertisement display region is set as a function (processing) of the browser application, and the advertisement information 171 and advertisement information 172 given from the management server 12 is displayed in the advertisement display region by the function of the browser application. The information regarding the website displayed as the home screen 101 is disposed in a region other than the advertisement display region.

Figure 10:
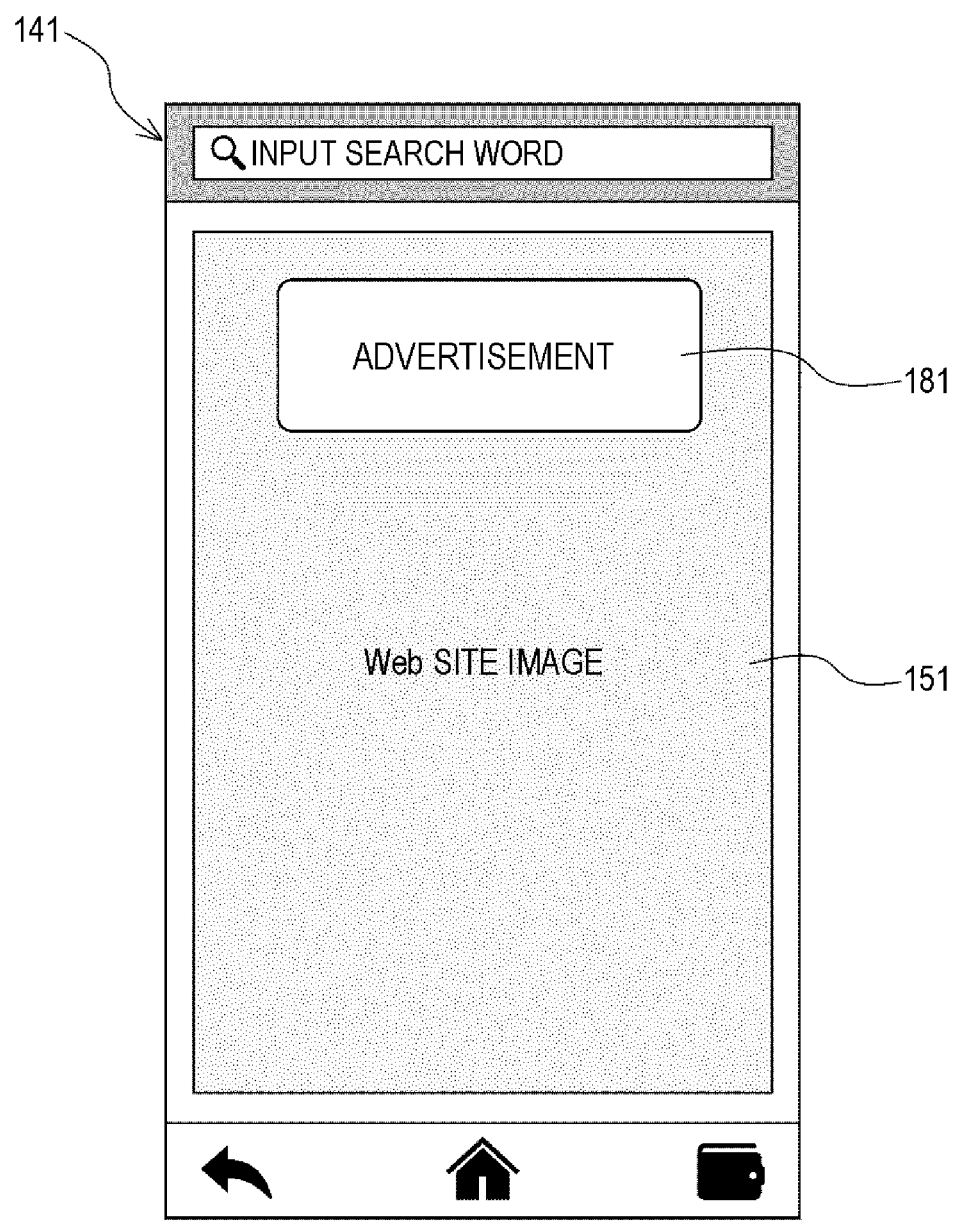
FIG. 10 is a diagram illustrating advertisement information displayed on a home screen of a client terminal.

FIG. 10 is a diagram illustrating advertisement information displayed on the web screen of the client terminal 14. Note that, in the figure, a portion corresponding to the web screen 141 of FIG. 5 is denoted by the same reference numeral as that of the web screen 141 of FIG. 5, and the description thereof will be omitted. In FIG. 10, advertisement information 181 is displayed so as to be superimposed on the website image 151. That is, the user A is notified of the advertisement information 181 in addition to the information regarding the website. The advertisement information 181 is information selected by the management server 12 on the basis of the NFT owned by the user A and the transaction information. However, as in FIG. 9, the advertisement information 181 may be displayed in the advertisement display region set as the function (processing) of the browser application, and the information regarding the website may be displayed in a region other than the advertisement display region. In a case where the website displayed on the web screen 141 is a website managed by the management server 12, the advertisement information 181 may be incorporated as a part of the information regarding the website.

Processing Procedure of Second Example

Figure 11:
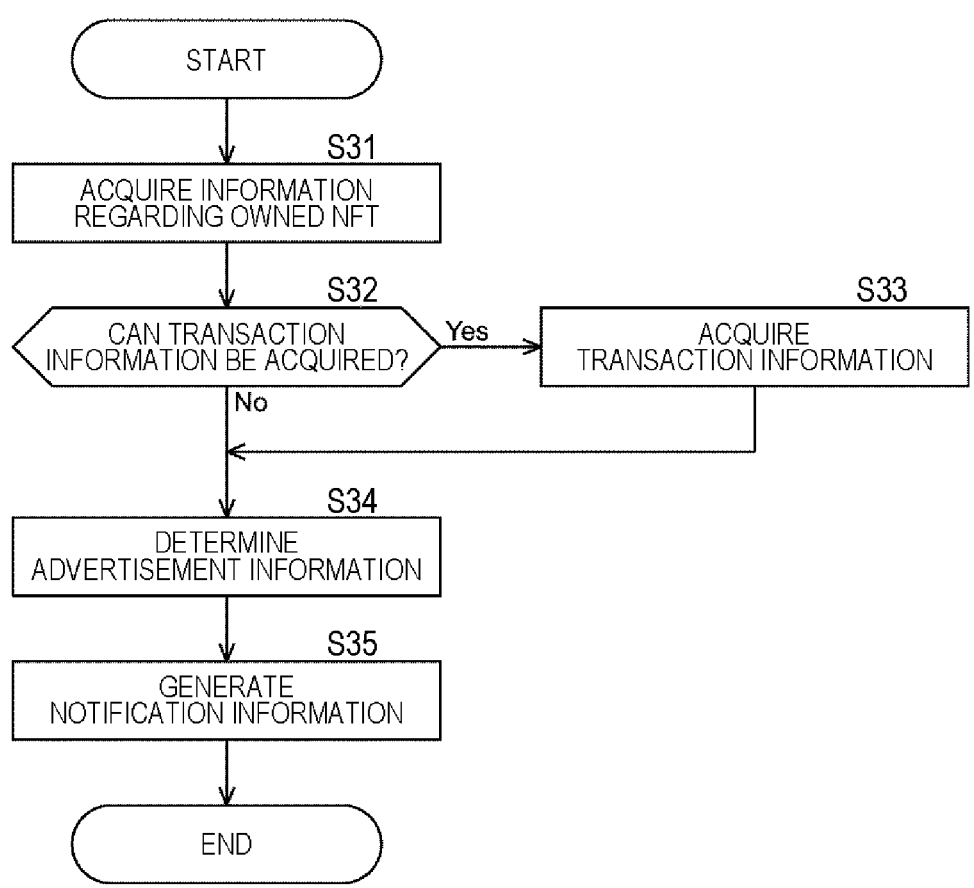
FIG. 11 is a flowchart illustrating a processing procedure according to a second example.

FIG. 11 is a flowchart illustrating a processing procedure according to a second example.

In step S31, the control unit 33 (the blockchain information management unit 55 or the service/application management unit 56) of the management server 12 acquires information (NFT-related information) related to the NFT owned by the client terminal 14 (user A). Note that acquisition of the NFT-related information in the management server 12 is similar to that in step S12 of FIG. 8, and thus the description thereof will be omitted. The processing proceeds from step S31 to step S32.

In step S32, the control unit 33 (the blockchain information management unit 55 or the service/application management unit 56) of the management server 12 determines whether or not the transaction information of the user A can be acquired.

In a case where it is determined in step S32 that the transaction information of the user A can be acquired, the processing proceeds to step S33, and the control unit 33 acquires transaction information that can be acquired. The processing proceeds from step S33 to step S34.

In a case where it is determined in step S32 that the transaction information of the user A cannot be acquired, the processing skips step S33 and proceeds to step S34.

In step S34, the control unit 33 (notification information determination unit 51) determines advertisement information to be presented to the user A on the basis of the NFT information acquired in step S31 and the transaction information acquired in step S34. In a case where step S34 is skipped, the control unit 33 determines advertisement information to be displayed on the client terminal 14 on the basis of only the NFT information acquired in step S31 or on the basis of the NFT information and a site browsing history in the browser application. The processing proceeds from step S34 to step S35.

In step S35, the control unit 33 generates notification information to be transmitted to the client terminal 14 on the basis of the advertisement information determined in step S34. The control unit 33 transmits the generated notification information to the client terminal 14 via the communication unit 31. As a result, the notification information (advertisement information) is displayed with the browser application of the client terminal 14.

Note that, in the determination of the advertisement information, the type of advertisement may be changed according to the type of NFT owned by the user A. For example, it is assumed that the NET content owned by the user A is an artist's digital card and is the NFT that can be acquired by participating in the live show of the artist. In this case, it can be determined that the user A has a high preference for the artist's live show. Therefore, the advertisement information presented to the user A can be live information of a music genre similar to that of the artist.

The pieces of notification information of the first example and second example described above may be information related to a site of a service participating in a platform created by a specific company, or may be information related to one site providing a service in a case where the specific company is not a platform.

Program

The above-described series of processing by the management server 12 or the client terminal 14 can be executed by hardware or can be executed by software. In a case where a series of processing is executed by the software, a program constituting the software is installed on a computer. Here, examples of the computer include a computer incorporated in dedicated hardware, and a general-purpose personal computer capable of executing various functions by installing various programs.

FIG. 12 is a block diagram illustrating a configuration example of the hardware of the computer in a case where the computer executes each processing executed by the management server 12 or the client terminal 14 with a program.

In the computer, a central processing unit (CPU) 201, a read only memory (ROM) 202, and a random-access memory (RAM) 203 are connected to one another via a bus 204.

An input/output interface 205 is further connected to the bus 204. The input/output interface 205 is connected to an input unit 206, an output unit 207, a storage unit 208, a communication unit 209, and a drive 210.

The input unit 206 includes a keyboard, a mouse, and a microphone. The output unit 207 includes a display and a speaker. The storage unit 208 includes a hard disk and a non-volatile memory. The communication unit 209 includes a network interface. The drive 210 drives a removable medium 211 such as a magnetic disk, an optical disk, a magnetooptical disk, or a semiconductor memory.

In the computer configured as described above, for example, the CPU 201 loads the program stored in the storage unit 208 into the RAM 203 via the input/output interface 205 and the bus 204 and executes the program, and thus the above-described series of processing is performed.

The program executed by the computer (CPU 201) can be provided by being recorded in the removable medium 211 as a package medium or the like, for example. Furthermore, the program can be provided via a wired or wireless transmission medium such as a local area network, the Internet, or digital satellite broadcasting.

In the computer, the program can be installed in the storage unit 208 via the input/output interface 205 by loading the removable medium 211 in the drive 210. Furthermore, the program can be received by the communication unit 209 via a wired or wireless transmission medium and installed in the storage unit 208. In addition, the program can be installed in advance on the ROM 202 and the storage unit 208.

Note that the program executed by the computer may be a program for processing in time series in the order described in the present description, or a program for processing in parallel or at a necessary timing such as when a call is made.

The present technology can also have the following configurations.

(1)
An information processing device including
a notification information determination unit configured to acquire, from a terminal used by a user, information regarding a unique token owned by the user, and determine notification information of which the user is notified by the terminal on the basis of the token owned by the user.

(2)
The information processing device according to (1), in which the notification information determination unit determines the notification information notification of which is provided in addition to information regarding a site on a network, which is browsed by the user with the terminal.

(3)
The information processing device according to (2), in which the notification information determination unit determines notification information to be displayed with an application of the terminal for the user to browse the site.

(4)
The information processing device according to (2), in which the notification information determination unit determines the notification information notification of which is provided as information regarding the site, which is browsed by the user with the terminal.

(5)
The information processing device according to any one of (1) to (4),
in which the notification information determination unit determines, as the notification information, information for providing notification that a site on a network, which is browsed by the user with the terminal, is related to the token owned by the user.

(6)
The information processing device according to any one of (1) to (5),
in which the notification information determination unit determines, as the notification information, information for providing notification that a site on a network, which is browsed by the user with the terminal, is a site corresponding to the token owned by the user.

(7)
The information processing device according to any one of (1) to (6),
in which the notification information determination unit determines, as the notification information, information for providing notification that a site on a network, which is browsed by the user with the terminal, executes an event related to the token owned by the user.

(8)
The information processing device according to any one of (1) to (7),
in which the notification information determination unit determines the notification information on the basis of a rarity degree, rank, amount, or holding period of the token owned by the user.

(9)
The information processing device according to any one of (1) to (8),
in which the notification information determination unit determines advertisement information as the notification information.

(10)
The information processing device according to (9),
in which the notification information determination unit determines the notification information on the basis of transaction information of the user recorded on a blockchain.

(11)
The information processing device according to (9) or (10),
in which the notification information determination unit changes a type of the advertisement information according to a type of the token owned by the user.

(12)
The information processing device according to any one of (1) to (11), further including
a token issuing unit configured to issue the token on a blockchain.

(13)
The information processing device according to any one of (1) to (12),
in which the token is a non-fungible token.

(14)
An information processing method including,
by a notification information determination unit of an information processing device including the notification information determination unit, acquiring, from a terminal used by a user, information regarding a unique token owned by the user, and determining notification information of which the user is notified by the terminal on the basis of the token owned by the user.

(15)
A program for causing a computer to function as a notification information determination unit configured to acquire, from a terminal used by a user, information regarding a unique token owned by the user, and determine notification information of which the user is notified by the terminal on the basis of the token owned by the user.

Reference Signs List

1 Information processing system
11 Service provider
12 NFT content management server
13 Blockchain
14 Client terminal
15 Marketplace
31 Communication unit
32 Acquisition unit
33 Control unit
51 Notification information determination unit
52 Token (NFT) issuing unit
53 NFT content management unit

The invention claimed is:

1. An information processing device, comprising:
a processor configured to:
acquire, from a user terminal, first information associated with a specific token of a user, wherein the specific token includes a non-fungible token;
determine notification information based on the specific token, wherein the user terminal displays the notification information to notify the user;
determine, as the notification information, second information associated with a site on a network, wherein
the site is browsed by the user on the user terminal, and
based on the second information, the user terminal one of:
notifies the user that the site is associated with the specific token, or
notifies the user that the site corresponds to the specific token; and
control display of a web service on the user terminal based on the notification information.

2. The information processing device according to claim 1, wherein the processor is further configured to determine application information associated with an application of the user terminal to browse the site.

3. The information processing device according to claim 1, wherein
based on the second information, the user terminal notifies the user that the site executes an event associated with the specific token.

4. The information processing device according to claim 1, wherein the processor is further configured to determine the notification information based on at least one of a rarity degree of the specific token, a rank of the specific token, an amount of the specific token, or a holding period of the specific token.

5. The information processing device according to claim 1, wherein the processor is further configured to determine advertisement information as the notification information.

6. The information processing device according to claim 5, wherein the processor is further configured to:
   determine the notification information based on transaction information of the user; and
   record the transaction information on a blockchain.

7. The information processing device according to claim 5, wherein the processor is further configured to change a type of the advertisement information based on a type of the specific token.

8. The information processing device according to claim 1, wherein the processor is further configured to issue the specific token on a blockchain.

9. An information processing method, comprising:
   in an information processing device:
      acquiring, from a user terminal, specific information associated with a specific token of a user, wherein the specific token includes a non-fungible token;
      determining notification information based on the specific token, wherein the user terminal displays the notification information to notify the user;
      determining, as the notification information, second information associated with a site on a network, wherein
         the site is browsed by the user on the user terminal, and
         based on the second information, the user terminal one of:
            notifies the user that the site is associated with the specific token, or notifies the user that the site corresponds to the specific token; and
      controlling display of a web service on the user terminal based on the notification information.

10. A non-transitory computer-readable medium having stored thereon, computer-executable instructions which when executed by a processor, cause the processor to execute operations, the operations comprising:
   acquiring, from a user terminal, specific information associated with a specific token of a user, wherein the specific token includes a non-fungible token;
   determining notification information based on the specific token, wherein the user terminal displays the notification information to notify the user;
   determining, as the notification information, second information associated with a site on a network, wherein
      the site is browsed by the user on the user terminal, and
      based on the second information, the user terminal one of:
         notifies the user that the site is associated with the specific token, or
         notifies the user that the site corresponds to the specific token; and
   controlling display of a web service on the user terminal based on the notification information.

* * * * *